US012259840B1

(12) United States Patent
Peterson

(10) Patent No.: US 12,259,840 B1
(45) Date of Patent: *Mar. 25, 2025

(54) SYSTEM AND METHOD FOR CHECKING DATA TO BE PROCESSED OR STORED

(71) Applicant: Yellowbrick Data, Inc., Mountain View, CA (US)

(72) Inventor: Jim Peterson, San Jose, CA (US)

(73) Assignee: Yellowbrick Data, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,340

(22) Filed: Jan. 16, 2024

Related U.S. Application Data

(63) Continuation of application No. 17/818,663, filed on Aug. 9, 2022, now Pat. No. 11,874,790, which is a continuation of application No. 17/086,455, filed on Nov. 1, 2020, now Pat. No. 11,409,688.

(60) Provisional application No. 63/042,541, filed on Jun. 22, 2020, provisional application No. 62/929,676, filed on Nov. 1, 2019.

(51) Int. Cl.
*G06F 13/42* (2006.01)
*G06F 21/64* (2013.01)

(52) U.S. Cl.
CPC .......... *G06F 13/4221* (2013.01); *G06F 21/64* (2013.01); *G06F 2213/0024* (2013.01)

(58) Field of Classification Search
CPC ................. G06F 21/64; G06F 13/4221; G06F 2213/0024
See application file for complete search history.

(56) References Cited

U.S. PATENT DOCUMENTS

| | | | |
|---|---|---|---|
| 2004/0030966 A1* | 2/2004 | Spieker ................. | H04L 1/0045 714/704 |
| 2006/0159023 A1* | 7/2006 | Hickey ................. | H04L 1/0045 370/241 |
| 2007/0022225 A1* | 1/2007 | Nair .................... | G06F 11/1004 710/22 |
| 2008/0285476 A1* | 11/2008 | Rajakarunanayake | ...................... H04L 1/0045 370/252 |
| 2010/0199159 A1* | 8/2010 | Isnardi .................. | H04L 1/0083 714/E11.032 |

* cited by examiner

*Primary Examiner* — Henry Tsai
*Assistant Examiner* — Christopher A Daley
(74) *Attorney, Agent, or Firm* — Innovation Partners LLC; Charles E. Gotlieb

(57) ABSTRACT

A system and method checks packetized data retrieved from a bus that is ordinarily considered reliable that was already error checked and/or corrected before being placed on the bus by applying a hash or checksum or other function to each packet to produce a packet checksum and then applying another function to the ordered packet checksums and comparing the result to one sent by the device that checked and/or corrected, and sent, the data packets.

18 Claims, 3 Drawing Sheets

SYSTEM AND METHOD FOR CHECKING DATA TO BE PROCESSED OR STORED

RELATED APPLICATIONS

This application is a continuation of U.S. patent application Ser. No. 17/818,663 entitled, "System and Method for Checking Data to be Processed or Stored" filed by Jim Peterson on Aug. 9, 2022, which is a continuation of U.S. patent application Ser. No. 17/086,455 entitled, "System and Method for Checking Data to be Processed or Stored" filed by Jim Peterson on Nov. 1, 2020, which claims the benefit of U.S. Provisional Patent Application Ser. No. 62/929,676 entitled, "Method and Apparatus for Checking Data to be Stored" filed by Jim Peterson on Nov. 1, 2019, and U.S. Provisional Patent Application Ser. No. 63/042,541 entitled, "Method and Apparatus for Checking Data to be Stored" filed by Jim Peterson on Jun. 22, 2020, each having the same assignee as the present invention and each is incorporated by reference in its entirety.

FIELD OF THE INVENTION

The present invention is related to computer software and hardware and more specifically to computer software and hardware for requesting data from a memory circuit over a reliable bus interface.

BACKGROUND OF THE INVENTION

Techniques for requesting data from memory circuits via a reliable bus interface such as a PCI bus may be suboptimal. What is needed is a system and method that can request data in anticipation of it being stored or processed.

SUMMARY OF INVENTION

A system and method in a monitoring circuit separately receives data flowing over a bus such as a PCI bus that has been sourced by a memory circuit coupled to a data storage in response to a request from a processing circuit that also receives the data. The memory circuit optionally error checks, and provides via a bus, such as a conventional PCI bus, the requested data in packets that the monitoring circuitry and processing circuitry may receive out of order, and the memory circuit also provides a checksum that the monitoring circuitry receives. The monitoring circuitry processes each packet through a function, such as a hash function or checksum function to produce a packet checksum, that is then stored in a memory, either in logical or physical order, without simultaneously storing, and additionally discarding, the packets themselves. When the last packet is received, the monitoring circuitry uses the packet checksums to produce an overall checksum, such as by applying a position dependent checksum function to the packet checksums in order. The monitoring circuitry compares the overall checksum it produced with the checksum received from the memory circuit. The monitoring circuitry then informs the processing circuitry whether the overall checksum matches or otherwise corresponds to the checksum it received from the memory circuit. Either the monitoring circuitry or the processing circuitry re-requests the data from the memory circuit if the compared checksums do not match or otherwise correspond, and the processing circuitry invalidates the received data and/or any processing performed with it. If the compared checksums do correspond, the processing circuitry stores or processes the data or continues storing or processing it.

DETAILED DESCRIPTION OF A PREFERRED EMBODIMENT

Figure 1:
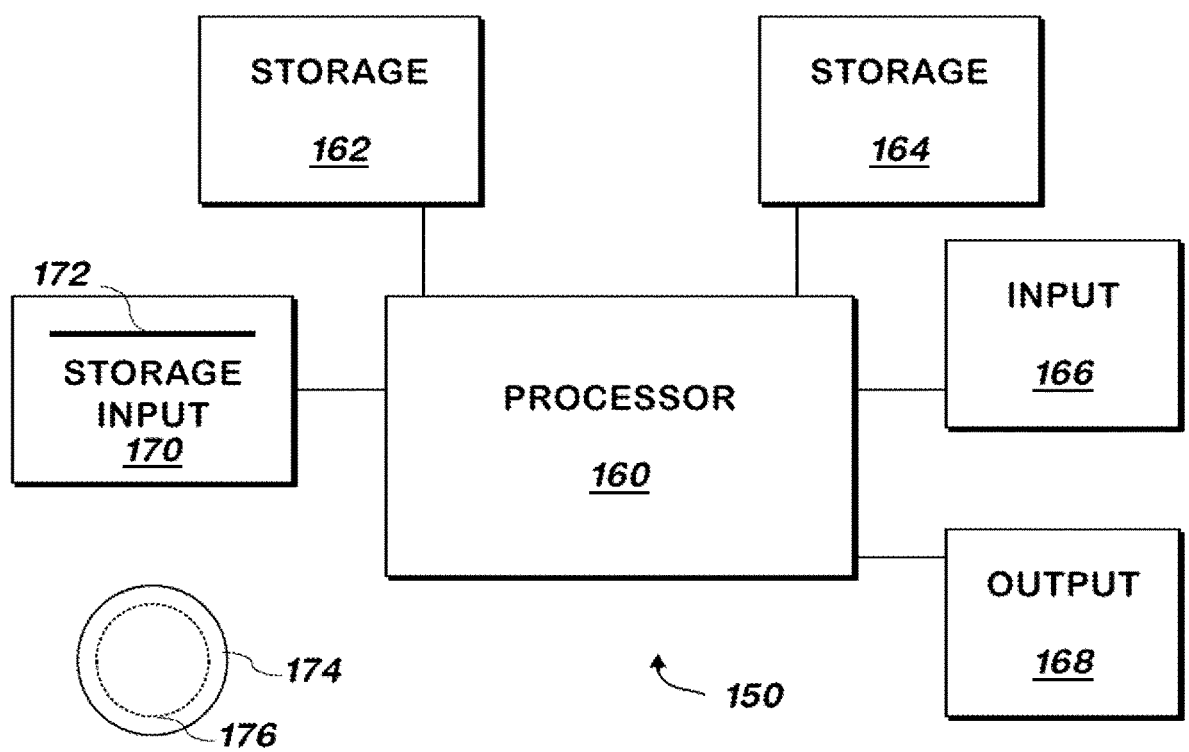
FIG. 1 is a block schematic diagram of a conventional computer system.

The present invention may be implemented as computer software or computer firmware, on a conventional computer system or as custom silicon such as a gate array or FPGA. Referring now to FIG. 1, a conventional computer system 150 for practicing the present invention is shown. Processor 160 retrieves and executes software instructions stored in storage 162 such as memory, which may be Random Access Memory (RAN) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile, non-transitory storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as WINDOWS 10) commercially available from MICROSOFT Corporation of Redmond Washington or a Macintosh computer system running the MACOS (such as Mojave) or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
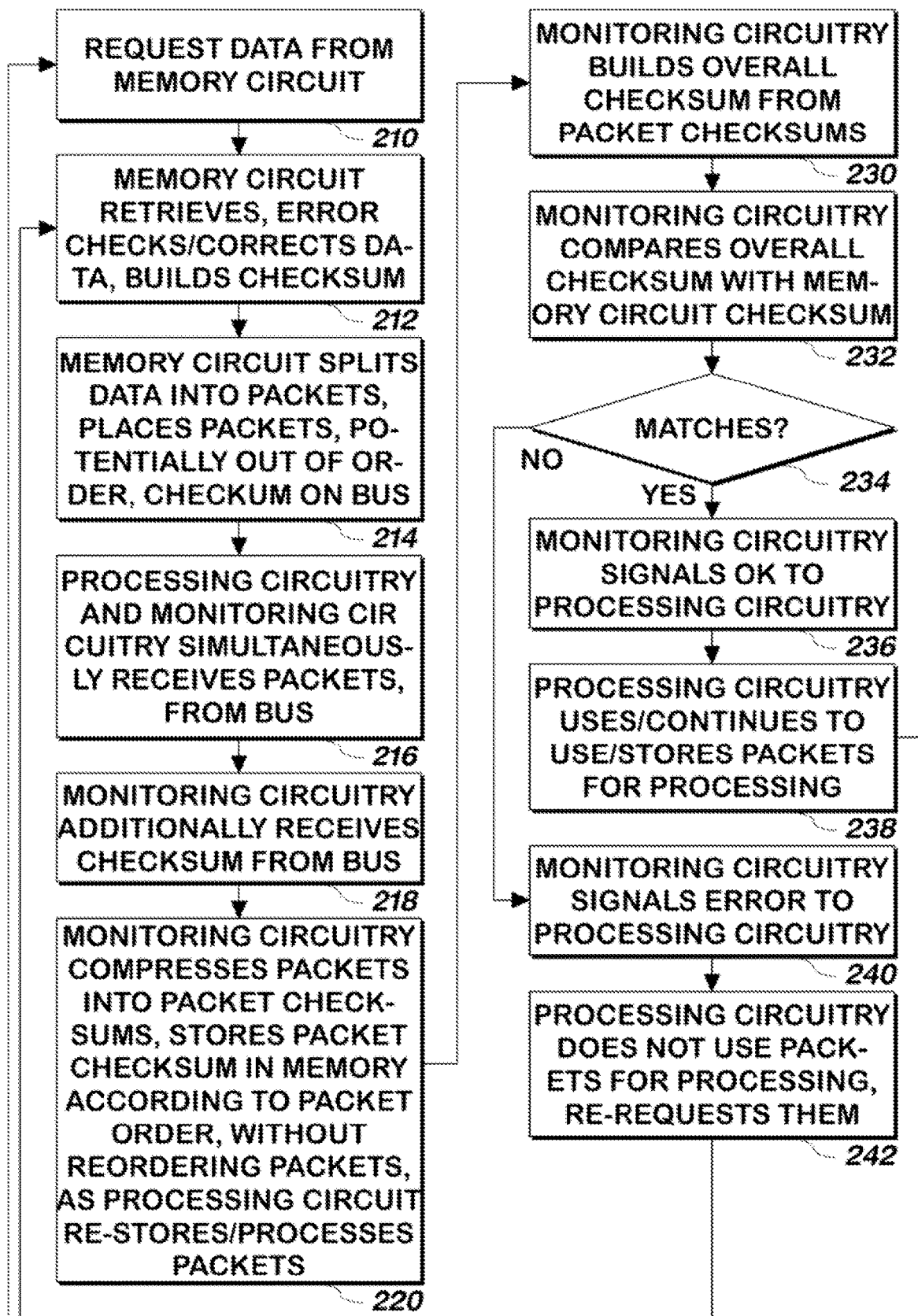
FIG. 2 is a flowchart illustrating a method of requesting data from a memory circuit according to one embodiment of the present invention.

Referring now to FIG. 2, a method of requesting data from a memory circuit is shown according to one embodiment of the present invention. The data is requested from the memory circuit 210. The data may be requested by processing circuitry that will process the data requested, or otherwise as described herein and below. In one embodiment, the memory circuit is any form of data storage circuitry that receives a request for a portion of data storage, responds to the request using the requested data provided using multiple packets, which may sometimes be sent out of order, performs conventional error correction and/or error checking, and provides a checksum of all of the packets along with the requested data.

In response to the request, the memory circuit retrieves the data, performs conventional error checking and/or error correction, and builds a checksum from the data 212. The memory circuit splits the data into two or more packets, and places the packets, which may be placed, or otherwise arrive, out of order, and the checksum, on to a memory or other conventional bus, such as a conventional PCI bus, along with the checksum 214. The bus may be a bus that is considered very reliable and on which packets sent that have already been checked for errors after being read from data storage may not typically be checked for errors. In one embodiment, a PCI bus is considered to be one such bus.

The processing circuitry receives the packets from the bus, along with monitoring circuitry that also receives the packets from the bus 216. The packets are received by the processing circuitry and the monitoring circuitry with an order identifier that indicates the order in which the packets should be assembled to reproduce the data as it was stored in the data storage accessed by the memory circuit. The processing circuitry performs no error checking or correction, in one embodiment. The monitoring circuitry additionally receives the checksum from the bus 218. In one embodiment, the monitoring circuitry is separate from the processing circuitry and may use its own bus interface, separate from that of the processing circuitry, or may tap off of the bus interface used by the processing circuitry, so that the data is accessible to both, independently of the other, and at approximately the same time.

The monitoring circuitry compresses each packet into a packet checksum and stores only the packet checksum in a data structure of packet checksums 220. The monitoring circuitry uses the order identifier to store the packet checksums in their proper order in the data structure, but it does not store or reorder the packets themselves. The order of the checksums in storage may be physical, or logical, with the order identifier stored with its corresponding packet checksum. As the monitoring circuitry is performing this task, the processing circuitry stores and/or processes the packets, optionally using the order identifier of each packet, as part of step 220. Step 220 is performed for each packet, as the packet is received, and the checksum may be received from the memory circuit either before, after, some or all of the packets. Any conventional checksum or hash technique may be applied to the packet or packet payload to create the packet checksums.

In one embodiment, each packet may be sent with a checksum computed by the memory circuit, but this checksum is disregarded by the monitoring circuit. It is also noted that in one embodiment, no running checksum is computed using all of the packets, instead the packet checksums are computed independently of one another and stored in order.

After the last packet has been used to create a packet checksum, the monitoring circuitry builds and overall checksum from the ordered packet checksums 230. This last packet may be flagged, or the number of packets may be provided with one or more of such packets, or the total size of all packets may be received with, before or after the packets, in which case the monitoring circuitry identifies the last packet by maintaining a cumulative data received, that cumulates the amount of data received with each packet into an overall total, and when the cumulative data received equals the total size sent, the monitoring circuitry identifies that the last packet has been received. In one embodiment, the last packet checksum is not stored with the others, but held for calculation of the overall checksum in a register.

To build the overall checksum from the packet checksums, in one embodiment, a position-dependent checksum technique is applied to the packet checksums, using their physical order (if reordered) or logical order. Such a position-dependent checksum technique may include the conventional Fletcher's checksum (e.g. Fletcher-16, Fletcher-32, Fletcher 64), Adler-32 or cyclic redundancy checks, techniques. The combination of the techniques used to create the packet checksums and to create the overall checksums should be selected in a way that they may be readily compared with the checksum provided by the memory circuit. For example, the memory circuit can use the same techniques as are described for the monitoring circuit to produce its checksum. Or the memory circuit can calculate a checksum that differs from that of the monitoring circuit by a ones complement function.

In one embodiment, the position dependent checksum technique is utilized in spite of the fact that errors in packet order are very unlikely, or impossible, or may be detectable without the use of the checksum, for example, by the monitoring circuit checking to make sure that all packet orders are accounted for or making sure that duplicate ordering (e.g. two packets identified as having the same order) is detected, so that the order dependent checksum technique is unnecessary, and may be more time consuming than order independent checksums to calculate.

The monitoring circuitry compares the overall checksum it calculates to the checksum received from the memory circuit 232. If the two checksums match or otherwise correspond 234, the monitoring circuitry provides a signal to the processing circuitry that the data is OK to process or store. Such a signal may be provided via the same bus used for sending the packets or may be provided via a different channel. When the signal is received, the processing circuitry uses the signal to store, or process the packets or uses the signal to validate the processing of the packets, which may already be in process when the signal is received 238. The method continues at step 210. Any number of requests containing any number of packets may be processed in this manner.

If the two checksums compared do not match or otherwise correspond 234, the monitoring circuitry provides an error signal to the processing circuitry 240, which does not process or discards or does not use or recalls the results of any processing that may have already occurred, and re-requests the data from the memory circuit 242. The method continues at step 212 using the re-request.

In one embodiment, the monitoring circuitry additionally re-requests the data from the memory circuit instead of the processing circuitry, to start the process more quickly, which may be performed before or after the error signal is sent. This re-request may involve the monitoring circuitry monitoring not just the data, but the original request so that it may send the re-request with the same parameters, or if the memory circuitry allows a re-request without parameters, the monitoring circuitry may send such a re-request without monitoring the original request.

System.

Figure 3:
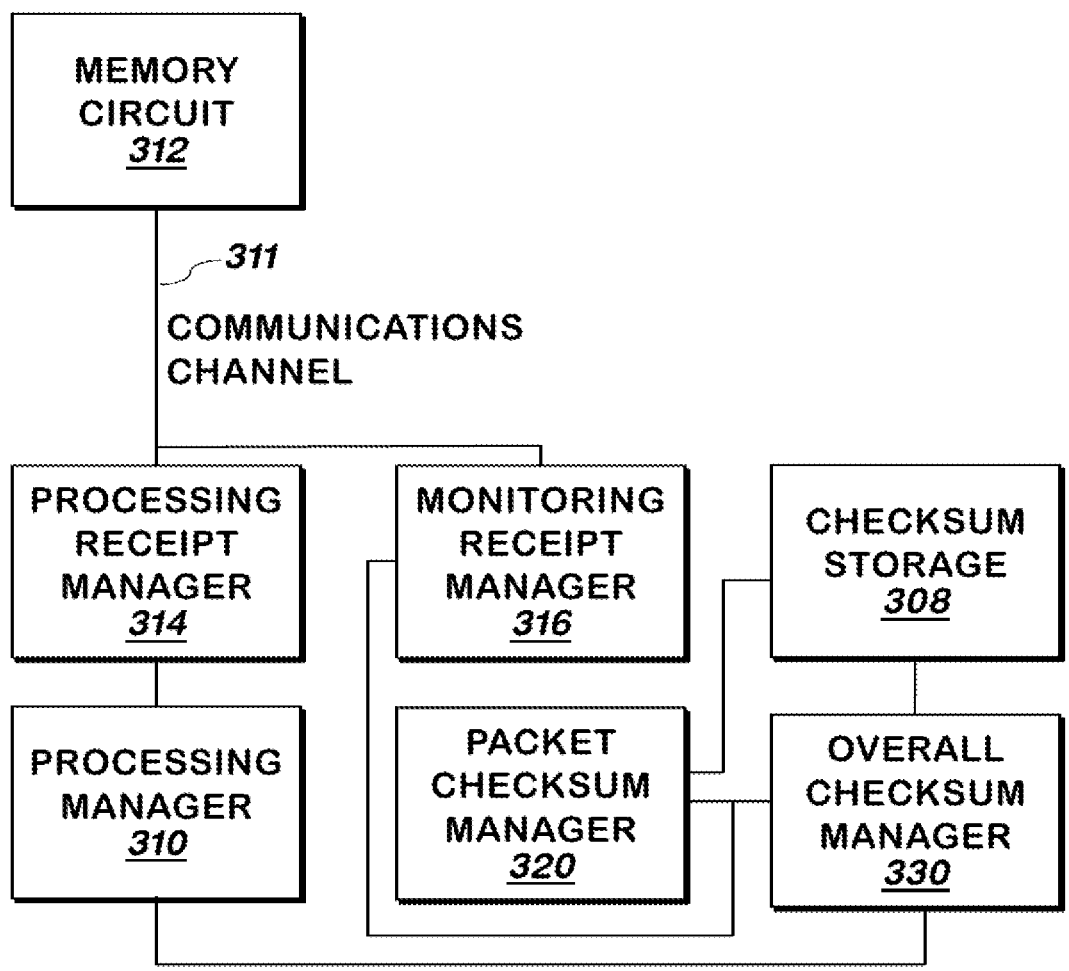
FIG. 3 is a system for requesting data sourced by a memory circuit according to one embodiment of the present invention.

Referring now to FIG. 3, a system for requesting data sourced by a memory circuit is shown according to one embodiment of the present invention. The various elements of FIG. 3 excluding element 312, may be made up of gate arrays or other silicon systems, optionally on a single silicon substrate or elements 308, 316-330 being on a single silicon substrate, or one or more computer processors, each running firmware, or a combination of these. The elements of FIG. 3 operate as described above and herein.

Processing manager 310 requests data from memory circuit 312 via processing receipt manager and communication channel 311. Communication channel 311 may be a conventional bus or network communication channel, such as a packet network, which may include a TCP/IP compatible communications network including conventional communications controllers appropriate for that type of communication channel at either end of communication channel 311.

Memory circuit 312 receives the request, locates the data, which may be located on a conventional SSD or memory that is part of memory circuit 312, assembles the data into multiple packets and places the packets onto communications channel 311 as described above and herein. As memory circuit 312 assembles or provides the data, it calculates a checksum for the data. In one embodiment, this is a single checksum for all of the data, which may be derived using packet checksums that are computed for each packet by memory circuit 312 as it assembles the packets or places them on communications channel 311.

Processing receipt manager 314 and monitoring receipt manager 316, which may be the same or different elements and may include a bus interface or a TCP/IP-compatible communications interface, receive the packets from communications channel 311 (e.g. simultaneously) and monitoring receipt manager 316 additionally receives the checksum from communications channel 311. Processing receipt manager 314 may receive the checksum from memory circuit 312 but does not use it in one embodiment.

As the packets are received, monitoring receipt manager 316 provides them to packet checksum manager 320, which computes a packet checksum from the packet data, and uses the information regarding the ordering of the packets contained in the packet headers or the packets themselves to store the packet checksums it computes in the appropriate order in checksum storage 308 without storing the packets as described above and herein. The order of the packets may be used as an offset to a starting memory location of checksum storage 308 and the packet checksums are stored at the resulting address, thereby storing the packet checksums in logical order. The checksum received from memory circuit is received by monitoring receipt manager 316 and provided to overall checksum manager 330, which stores it internally or via a memory. If the order of the packet checksums will not affect the overall checksum (described below), the packet checksums may be stored in any order, such as receipt order.

As the packets are received, processing receipt manager 314 provides the data and order to processing manager 310, which processes them, stores them into memory or other storage (not shown), or both. In one embodiment, such processing and/or storage is performed in parallel with, and independently of, the operation of packet checksum manager 320.

When all of the packets have been received by packet checksum manager 320, as detected using conventional methods, and their checksums computed and stored, packet checksum manager 320 signals overall checksum manager 330, which computes an overall checksum using the packet checksums in checksum storage 308. The computation of the packet checksums, and overall checksum by overall checksum manager 330, is either computed using the same manner as was used by memory circuit 312 or a different manner that will produce either the same result or a result that can allow the overall checksum to be compared to the checksum provided by memory circuit 312. The checksums of the packet and the overall checksum as well as that provided by memory circuit 312 may be computed using any conventional technique or a different one as described herein.

Overall checksum manager 330 compares the overall checksum to the one received from memory circuit 312. If the checksums match or are otherwise comparable, indicating that the packets received are unlikely to be different from the packets sent by memory circuit 312, overall checksum manager 330 does not signal processing manager 310 and otherwise, it does signal processing manager 310 (or signals OK in the first case and not OK in the second case). If signaled or signaled not OK, processing manager 310 discards the stored data and any processing of the stored data and re-requests the initially requested data from memory circuit 312 and the process is repeated until the checksums match or are otherwise comparable, after which processing manager 310 requests different data and repeats the above procedure for the different data and its checksum. Any number of requests that generate any number of data packets may be made in this manner.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments

Described is a method of checking two or more packets of digital data being received from a first device by a second device, the method including:

requesting the two or more packets from the first device receiving and storing by a first portion of the second device, the two or more packets requested;

computing at a second portion of the second device, a first checksum for each packet received;

storing the first checksums by the second portion of the second device;

after all of the two or more packets have been received, computing a second checksum from at least some of of the first checksums;

receiving a third checksum from the first device that was computed using all of the two or more packets;

comparing the second checksum to the third checksum at the first portion of the second device; and responsive to the comparing step, requesting for a second time the two or more packets from the first device.

The method may contain additional features, whereby, for a given packet, the storing the given packet is performed at least substantially simultaneously with the computing the first check sum for that given packet.

The method may contain additional features, whereby:

the packets may be received out of order; and the first checksums are stored in received order.

The method may contain additional features, whereby at least some of the first checksums comprises all of the first checksums.

The method:

may additionally include, responsive to the comparing step, signaling at the first portion of the second device to the second portion of the second device; and may include additional features, whereby the second portion of the second device requests the two or more packets.

The method may contain additional features, whereby the second checksum is computed responsive to the order of the two or more packets received.

Described is a system for checking two or more packets of digital data being received from a first device by a second device, the system including:

a processing manager having an output coupled to the first device, for requesting the two or more packets from the first device, and having an input coupled to the first device for receiving the two or more packets requested at an output, the processing manager for storing in a first computer memory via an input/output the two or more packets received;

a packet checksum manager having an input coupled to the first device for receiving the two or more packets, the packet checksum manager for computing at a first checksum for each packet received, storing via an input/output each first checksum into a second computer memory, and for providing a first signal at an output after all of the two or more packets have been received; and an overall checksum manager having an input coupled to the packet checksum manager output for receiving the first signal and to the first device for receiving a third checksum from the first device that was computed using all of the two or more packets, the overall checksum manager for, responsive to the signal, computing a second checksum from at least some of of the first checksums accessed via an input/output coupled to the second computer memory, for comparing the second checksum to the third checksum, and for providing at an output a second signal responsive to the comparing;

and wherein, one selected from:

the processing manager input is additionally coupled to the overall checksum manager output for receiving the second signal, the processing manager additionally for requesting the two or more packets from the first device at the processing manager output; and the overall checksum manager output is coupled to the first device, and the second signal requests the two or more packets from the first device, at least in part.

The system may contain additional features, whereby, for a given packet, the storing the given packet is performed at least substantially simultaneously with the computing the first check sum for that given packet.

The system may contain additional features, whereby:

the packets may be received out of order; and the first checksums are stored in received order.

The system may contain additional features, whereby at least some of the first checksums comprises all of the first checksums.

The system of may contain additional features, whereby the second checksum is computed responsive to the order of the two or more packets received.

The system of claim may contain additional features, whereby:

the overall checksum manager output is coupled to the first device; and the overall checksum manager output is additionally coupled to the processing manager input for receiving at least some of the second signal; and the processing manager is additionally for invalidating the two or more packets so they are not processed, responsive to the at least some of the second signal.

Described is a computer program product including a computer useable medium having computer readable program code embodied therein for checking two or more packets of digital data being received from a first device by a second device, the computer program product including computer readable program code devices configured to cause a computer system to:

request the two or more packets from the first device receive and storing by a first portion of the second device, the two or more packets requested;

compute at a second portion of the second device, a first checksum for each packet received;

store the first checksums by the second portion of the second device;

after all of the two or more packets have been received, compute a second checksum from at least some of of the first checksums;

receive a third checksum from the first device that was computed using all of the two or more packets;

compare the second checksum to the third checksum at the first portion of the second device; and responsive to the comparing step, request a second time the two or more packets from the first device.

The computer program product may contain additional features, whereby, for a given packet, the storing the given packet is performed at least substantially simultaneously with the computing the first check sum for that given packet.

The computer program product may contain additional features, whereby:

the packets may be received out of order; and the first checksums are stored in received order.

The computer program product may contain additional features, whereby at least some of the first checksums comprises all of the first checksums.

The computer program product:

may additionally include, responsive to the computer readable program code devices configured to cause the computer system to compare, computer readable program code devices configured to cause the computer system to signal at the first portion of the second device to the second portion of the second device; and may contain additional features, whereby the second portion of the second device requests the two or more packets.

The computer program product may contain additional features, whereby the second checksum is computed responsive to the order of the two or more packets received.

What is claimed is:

1. A method of checking a plurality of packets of digital data received from a first device by a second device, the method comprising:
   receiving and storing by a first portion of the second device, the plurality of packets;
   computing at a second portion of the second device, a first checksum for each of the plurality of packets;
   storing the first checksums by the second portion of the second device;
   after all of the plurality of packets have been received, computing a second checksum from at least some of the first checksums;
   receiving a third checksum from the first device that was computed using all of the plurality of packets;
   comparing the second checksum to the third checksum; and
   responsive to the comparing step, requesting the plurality of packets from the first device.

2. The method of claim 1, wherein, for a given one of the plurality of packets, the storing said given packet is performed at least substantially simultaneously with the computing the first checksum for that given packet.

3. The method of claim 1, wherein:
   the plurality of packets have an order;
   the plurality of packets may be received out of the order; and
   the first checksums are each stored in order in which a corresponding one of the plurality of packets was received.

4. The method of claim 1, wherein the at least some of the first checksums comprises all of the first checksums.

5. The method of claim 1:
   additionally comprising, responsive to the comparing step, providing a signal from the first portion of the second device to the second portion of the second device; and
   wherein the second portion of the second device requests the plurality of packets responsive to the signal.

6. The method of claim 1, wherein the second checksum is computed responsive to an order of the plurality of packets received.

7. A system for checking a plurality of packets of digital data received from a first device by a second device, the system comprising:
   a processing manager having an input coupled to the first device for receiving the plurality of packets, the processing manager for storing in a first computer memory via an input/output the plurality of packets received;
   a packet checksum manager having an input coupled to the first device for receiving the plurality of packets, the packet checksum manager for computing a first checksum for each of the plurality of packets, storing via an input/output each first checksum into a second computer memory, and for providing a first signal at an output after all of the plurality of packets have been received; and
   an overall checksum manager having an input coupled to the packet checksum manager output for receiving the first signal and to the first device for receiving a third checksum from the first device that was computed using all of the plurality of packets, the overall checksum manager for, responsive to the first signal, computing a second checksum from at least some of the first checksums, accessed via an input/output coupled to the second computer memory, for comparing the second checksum to the third checksum, and for providing at an output a second signal responsive to the comparing, the second signal having a first state and a second state;
   and wherein, one selected from:
      the processing manager input is additionally coupled to the overall checksum manager output for receiving the second signal, the processing manager additionally for requesting the plurality of packets from the first device via a processing manager output, responsive to the second signal having the first state; and
      the overall checksum manager output is coupled to the first device, and the second signal having the first state re-requests the plurality of packets from the first device, at least in part.

8. The system of claim 7, wherein, for a given one of the plurality of packets, the storing said given packet is performed at least substantially simultaneously with the computing the first checksum for that given packet.

9. The system of claim 7, wherein:
   the plurality of packets have an order;
   the plurality of packets may be received out of the order; and
   the first checksums are each stored in order in which a corresponding one of the plurality of packets was received.

10. The system of claim 7, wherein the at least some of the first checksums comprises all of the first checksums.

11. The system of claim 7, wherein the second checksum is computed responsive to an order of the plurality of packets received.

12. The system of claim 7 wherein:
   the overall checksum manager output is coupled to the first device; and
   the overall checksum manager output is additionally coupled to the processing manager input, which is additionally for receiving at least some of the second signal; and
   the processing manager is additionally for invalidating the plurality of packets so they are not additionally processed, responsive to the at least some of the second signal.

13. A computer program product comprising a computer useable medium having computer readable program code embodied therein for checking a plurality of packets of digital data received from a first device by a second device, the computer readable program code comprising computer readable program code devices configured to cause a computer system to:
   receive and storing by a first portion of the second device, the plurality of packets;
   compute at a second portion of the second device, a first checksum for each of the plurality of packets;
   store the first checksums by the second portion of the second device;

after all of the plurality of packets have been received, compute a second checksum from at least some of the first checksums;

receive a third checksum from the first device that was computed using all of the plurality of packets;

compare the second checksum to the third checksum; and responsive to the comparing step, request the plurality of packets from the first device.

14. The computer program product of claim 13, wherein, for a given one of the plurality of packets, the storing said given packet is performed at least substantially simultaneously with the computing the first checksum for that given packet.

15. The computer program product of claim 13, wherein:

the plurality of packets have an order;

the plurality of packets may be received out of the order; and the first checksums are each stored in order in which corresponding one of the plurality of packets was received.

16. The computer program product of claim 13, wherein the at least some of the first checksums comprises all of the first checksums.

17. The computer program product of claim 13:

additionally comprising, responsive to the computer readable program code devices configured to cause the computer system to compare, computer readable program code devices configured to cause the computer system to provide a signal from the first portion of the second device to the second portion of the second device; and wherein the second portion of the second device requests the plurality of packets responsive to the signal.

18. The computer program product of claim 13, wherein the second checksum is computed responsive to an order of the plurality of packets received.

* * * * *